Nov. 17, 1942.   H. SCHMIDT   2,302,640

REFRIGERATION THERMOMETER

Filed Dec. 23, 1940

INVENTOR
Harry Schmidt
BY Albert R Henry
ATTORNEY

Patented Nov. 17, 1942

2,302,640

UNITED STATES PATENT OFFICE 2,302,640

REFRIGERATION THERMOMETER

Harry Schmidt, Buffalo, N. Y., assignor to Fedders Manufacturing Company, Inc., Buffalo, N. Y.

Application December 23, 1940, Serial No. 371,249

4 Claims. (Cl. 73—374)

This invention relates to thermometers and to thermometer holding means which may be quickly attached to pipes or other portions of heat exchange devices.

The invention is directed to a novel holding and protecting structure for a thermometer which includes a clamping device for attachment to a pipe of a refrigeration or heating system and to a means for moving the thermometer into contact with the pipe. The invention also includes a heat shield which protects all portions of the thermometer against extraneous thermal influences while the bulb is in contact with the heat exchange surface.

Other features of the invention, including a novel bulb covering for the thermometer, are more fully set forth in the accompanying specification and drawing, wherein.

Figure 2:
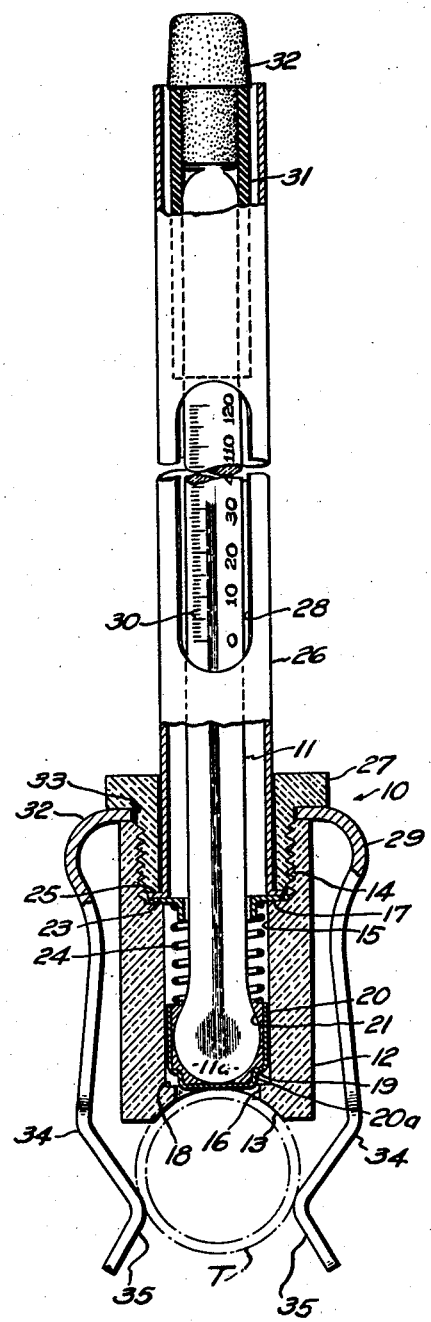
Fig. 2 is an enlarged cross section therethrough, with portions shown in elevation.

The housing 10 is formed to provide a positioning and holding means for a thermometer 11, and also a means for engaging a tube T, whose temperature is to be determined. The housing includes a cylindrical terminal member 12, preferably of a heat insulating material, whose lower extremity contains an arcuate groove 13. The member 12 is internally formed with a threaded portion 14, a bore 15, and a counterbore 16, which formations are of progressively decreasing diameters, thus defining upper and lower shoulders 17 and 18.

The bulb end 11a of the thermometer 11 is fitted loosely with a cap 20 formed of a metal of high conductivity. The cap is used as a mold for receiving a solder metal filling 21, which filling adheres closely to the bulb end 11a and thus permits good thermal transmission from the cap 20 to the entire surface of the bulb end 11a. The filling 21 may be of an alloy having an extremely low melting point, such as Wood's metal, or, if the thermometer design and material permit, higher melting point metals may be used. The cap 20 is formed with a shoulder 19 which may engage the shoulder 18 of the terminal member, and with a portion 20a of reduced diameter which extends into the counterbore 16.

In assembling the thermometer 11 with the housing 10, the bulb end 11a is slidably positioned in the bore 15. A washer 23 engages a spring 24, which has previously been placed about the thermometer, and the flanged end 25 of a cylindrical casing 26 is positioned on the washer 23. A clamp member 29 is added to the assembly, and all the parts are finally held in place by a nut 27 which is entered in the threaded portion 14 to fix the clamp member rigidly in place. The end of the nut 27 also engages the flange 25 in a light frictional contact, so that it is possible to rotate the casing 26.

The casing 26 is formed with an elongated window 28 which may be brought into registry with the graduations 30 on the body of the thermometer 11. The upper end of the thermometer is covered with a protective rubber tube 31 in which a button 32 is cemented. The button 32 projects from the casing 26, and it provides a means for rotating the thermometer in its mounting.

The clamp member 29 consists of a body portion 32 having a central hole 33 through which the threaded portion of the nut 27 extends, and it is also formed with depending tines 34. The tines 34 terminate in offset portions 35 which project beyond the end of the terminal member 12.

Figure 1:
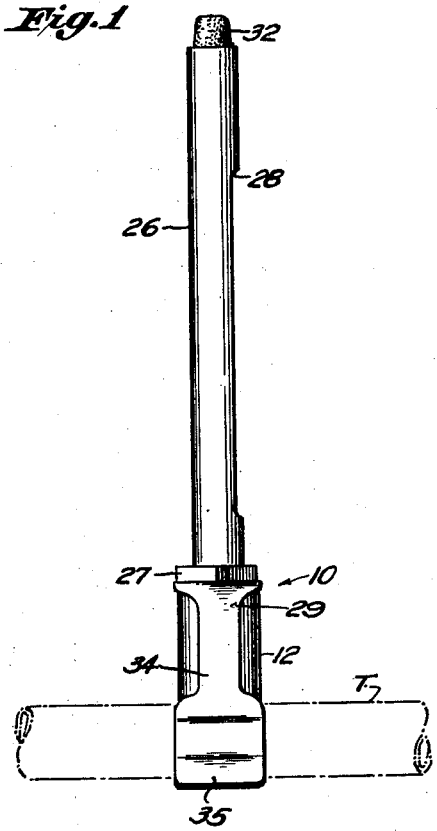
Fig. 1 is a side elevation of the thermometer device.

It will be apparent that the device may be readily applied to any tubular portion of a refrigeration coil by simply pressing the resilient tines 34 over the tube, as shown in Fig. 1. This brings the tube into engagement with the end of the cap 20, whereupon the thermometer is moved upward against the pressure of the spring 24 until the tube seats in the groove 13 of the terminal member 12. The contact between the tube T and cap 20 now causes the thermometer to respond and provide an accurate reading in the shortest possible time. It will be observed that during this operation the bulb or cap end 11a of the thermometer is adequately shielded from all extraneous heat exchange influences by the insulating properties of the terminal member 12.

The thermometer may be read from almost any angle or position, since both the shielding casing 26 and the thermometer 11 are independently rotatable to bring the window 28 and graduations 30 into the most advantageous line of sight.

It will be apparent that although the present device is mentioned as adapted for refrigeration service, it may, with slight modification, be used in other heat exchange arts, without departing from the inventive concept, as set forth in the following claims.

I claim:

1. A thermometer assembly for measuring surface temperatures on heat exchangers, comprising an elongated thermometer having a bulb on one extremity, a tubular member of insulating material for slidably receiving the bulb end of the thermometer, a clamp secured to the tubular member and having resilient tines projecting beyond one end of the member and adapted to engage and hold a pipe against such end of said member, a spring in said member engaging and urging the thermometer bulb into contact with the pipe to which the tines may be attached, a protective tube enclosing the remainder of the thermometer and formed with a window through which the thermometer may be read, and means for attaching the tube to said member for rotary adjustment.

2. A thermometer assembly for measuring surface temperatures on heat exchangers, comprising an elongated thermometer having a bulb on one extremity, a member of heat insulating material having a bore therethrough wherein the bulb end of the thermometer is slidably mounted, a shoulder in the bore, a protective tube enclosing the remainder of the thermometer and formed with a window through which the thermometer may be read, one end of the tube being entered in the bore of said member and formed with a flange seating on said shoulder, a nut secured to the member and frictionally engaging the flange, a clamp carried by said member and having pipe-engaging means disposed beyond the free end of said member, and a spring in said member for moving the thermometer bulb in said bore in the direction of the free end of the member and into contact with a pipe which may be engaged by said clamp.

3. A thermometer assembly for measuring surface temperatures on heat exchangers, comprising an elongated thermometer having a bulb on one extremity, a two-part housing for the thermometer, means joining the parts for relative rotational adjustment, one part being formed to slidably receive the bulb of the thermometer and having an opening in its free end through which the bulb may contact the object the temperature of which is to be measured, the remaining part having a window through which the thermometer may be read, said first part having a clamp affixed thereto, said clamp having resilient pipe-engaging means projecting beyond the free end of said first part, resilient means in the housing for moving the thermometer bulb into contact with a pipe which may be engaged by said clamp.

4. A thermometer assembly for measuring surface temperatures on heat exchangers, comprising an elongated thermometer having a stem and a bulb on one extremity thereof, a metallic cap over the bulb, a metallic filling in the cap and engaging the bulb to secure the cap to the bulb, a hollow member formed with a bore therethrough into which the bulb end of the thermometer extends, said cap being adapted to contact the surface whose temperature is to be measured through one end of the bore, a protective tube extending upwardly from the hollow member and surrounding the stem of the thermometer, said tube being formed with a window, spring means in the bore for urging the bulb toward the free end thereof, means on the cap cooperating with said bore for limiting the action of said spring, and a resilient sleeve on the upper end of the stem and projecting from the upper end of the tube to protect said thermometer and provide means for its manipulation.

HARRY SCHMIDT.